(No Model.)
R. NEIL.
FLAT SEAM KNIFE FOR USE IN SOLDERING CANS.
No. 252,845. Patented Jan. 24, 1882.
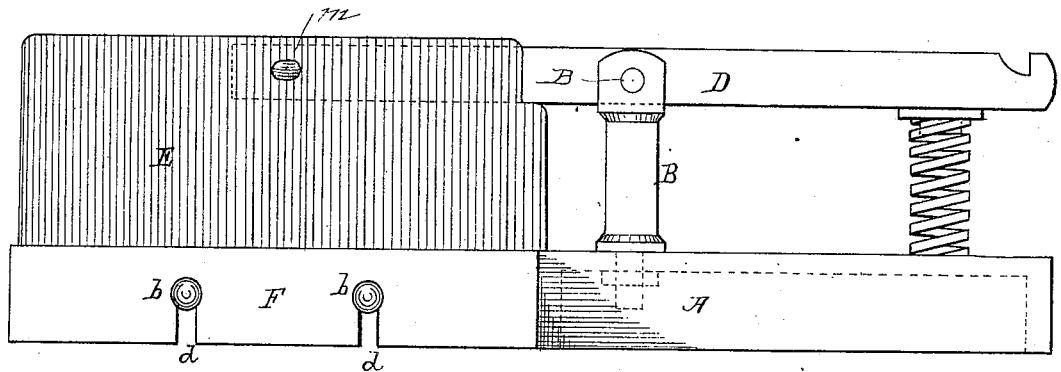
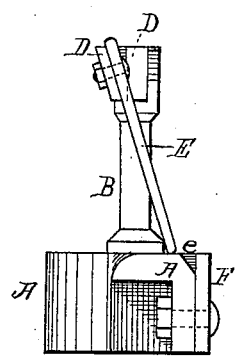
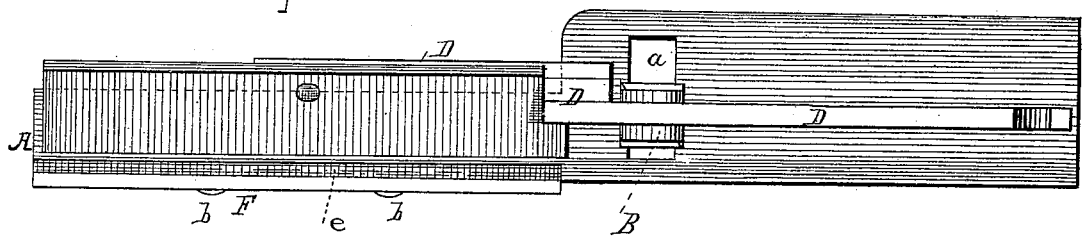
Witnesses:
Chas. E. Gill
Herman Gustow
Inventor:
Robert Neil
By his Atty's.
Cox and Cox.

UNITED STATES PATENT OFFICE.

ROBERT NEIL, OF WILMINGTON, DELAWARE, ASSIGNOR OF ONE-HALF TO J. MOIR CLARK, OF LONDON, ENGLAND.

FLAT-SEAM KNIFE FOR USE IN SOLDERING CANS.

SPECIFICATION forming part of Letters Patent No. 252,845, dated January 24, 1882.

Application filed September 12, 1881. (No model.)

*To all whom it may concern:*

Be it known that I, ROBERT NEIL, of Wilmington, in the county of New Castle and State of Delaware, have invented a new and useful Improvement in Flat-Seam Knives for use in Soldering Cans, of which the following is a specification, reference being had to the accompanying drawings.

The invention relates to an improved flat-seam knife for use in soldering the seams of cans; and it consists in the devices hereinafter described, and pointed out in the claim.

The object of the invention is to provide an adjustable means for quickly soldering the seams of cans, and with considerably less solder than is employed now for that purpose.

The invention also dispenses with the various-sized cylinders now used, and affords a device by which cans of any size can be seamed without loss of time.

Referring to the accompanying drawings, Figure 1 is a side view, Fig. 2 is an end view, and Fig. 3 a top view, of my invention.

A indicates the sole-plate, having at about its center the elongated slot $a$, in which is mounted the adjustable standard B. In the upper end of the standard B is mounted the lever D, which at its rear end will connect with a suitable treadle, so as to be operated by the foot of the attendant. Beneath the rear end of the lever D will be supplied a spring, by which the front end of the lever will have a tension downward. Upon the front end of the lever D is pivotally secured, at about its center, the blade E, which inclines to one side, its lower edge extending downward sufficiently to come in contact with the upper surface of the sole-plate A, near its outer edge. The blade E will be connected with the lever at a single point, $m$, so as to always rest squarely upon the sole-plate, or upon the metal, no matter what thickness of the latter is employed.

Upon the vertical side edge of the sole-plate A, near its front end, is secured the guide F, by means of the bolts $b$. The bolts pass through slots $d$ formed in the guide, and through corresponding slots in the edge of the sole-plate, and have a head on one end and a nut on the other, by which head and nut the bolts are prevented from slipping through the slots. The purpose of the slots $d$ is to permit the guide F to be adjusted vertically on the bolts $b$, to accomplish which it is only necessary to loosen the bolts by means of the nuts, move the guide either upward or downward, and then retighten the bo'ts. The object of this vertical adjustment of the guide F is to adapt the device for use in soldering the seams of cans of various sizes, and the particular purpose of the guide is (in connection with the blade E) to keep the two edges or lap of the metal tight—that is, in close contact—until the hot iron has been applied.

The upper edge of the sole-plate A, opposite to the corresponding portion of the guide F, is cut away or beveled, so as to form a V-shaped groove, $e$, between the sole and guide, over which groove the overlapping edges of the metal are placed and the hot iron then passed over them.

In the employment of the invention the metal forming the body of the can is bent into a cylindrical form, its two side edges being made to overlap, after which it is passed over the front end of the sole-plate A and guide F, and under the blade E. The blade E presses down on one edge of the seam, and the guide F, being a resistance to the downward pressure of the blade, acts as an upward pressure on the other edge of the seam, whereby the lapped edges are held in firm contact with each other until the hot iron is applied.

By adjusting the guide F vertically, as aforesaid, the device may be adapted to cans of different sizes. For instance, if the guide has been set to close the seam of a can which is two inches in diameter, and a can six inches in diameter is placed over it, it will be found that the seam will gap open, because that side of the body-blank which has the underlap of its seam, and which lap is located over that side of the sole-plate on which is the guide F, being on a sole-plate two small for it, has no support, hence the weight of the body drags it down away from the overlap, making between the laps a gutter-like gap, V-shaped in cross-section, whose apex is the line along which the blade E passes. To remedy this the guide need only be slightly elevated, when the under lap will be supported and the seam will be snugly closed. The blade E may rest upon one or both layers of the metal, according to the width of seam required.

What I claim as my invention, and desire to secure by Letters Patent, is—

A flat-seam knife for use in soldering cans, consisting of the sole-plate, the lever, the blade, and adjustable guide, substantially as set forth.

In testimony that I claim the foregoing improvement in flat-seam knives for soldering cans, as above described, I have hereunto set my hand this 23d day of June, 1881.

ROBERT NEIL.

Witnesses:
CHAS. C. GILL,
HERMAN GUSTOW.